US007567535B2

(12) United States Patent
Singh et al.

(10) Patent No.: US 7,567,535 B2
(45) Date of Patent: Jul. 28, 2009

(54) METHOD AND APPARATUS FOR IMPROVED LINK LAYER HANDOFF

(75) Inventors: Ajoy K. Singh, Round Lake, IL (US); Yogesh B. Bhatt, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 752 days.

(21) Appl. No.: 11/289,044

(22) Filed: Nov. 29, 2005

(65) Prior Publication Data

US 2006/0198341 A1    Sep. 7, 2006

Related U.S. Application Data (60) Provisional application No. 60/659,132, filed on Mar. 7, 2005.

(51) Int. Cl.
  *H04W 36/00* (2006.01)
(52) U.S. Cl. .................................... 370/331; 455/436
(58) Field of Classification Search ................. 370/331; 455/436–444
  See application file for complete search history.

(56) References Cited

U.S. PATENT DOCUMENTS

| 6,587,457 | B1 | 7/2003 | Mikkonen | |
|---|---|---|---|---|
| 2002/0012328 | A1* | 1/2002 | Emanuel et al. | 370/328 |
| 2005/0039101 | A1* | 2/2005 | Torsner | 714/748 |
| 2005/0138528 | A1* | 6/2005 | Ameigeiras et al. | 714/774 |
| 2006/0092864 | A1* | 5/2006 | Gupta et al. | 370/278 |

FOREIGN PATENT DOCUMENTS

EP    1443715 A    8/2004

OTHER PUBLICATIONS

Velayos H et al.: "Techniques to reduce the IEEE 802.11b handoff time", Communications, 2004 IEEE International Conference on Paris, France Jun. 20-24, 2004, Picataway, NJ, USA, IEEE, Jun. 20, 2004, pp. 3844-3848.

Sachs J et al.: "A generic link layer in a beyond 3G multi-radio access architecture", Communications, Circuits and Systems, 2004. ICCCAS 2004, 2004 International Conference on Chengdu, China Jun. 27-29, 2004, Piscataway, NJ, USA, IEEE, US Jun. 27, 2004, pp. 447-451, vol. 1.

(Continued)

*Primary Examiner*—Kwang B Yao
*Assistant Examiner*—Alex Skripnikov
(74) *Attorney, Agent, or Firm*—Brian M. Mancini (57) ABSTRACT

Various embodiments are described to address the need for an apparatus and method that improves link layer handoff by addressing the packet-loss problem existing today. An intermediate buffer management layer (IBML) (201, 211) is introduced below layer 3 of an OSI-based communications interface. The IBML buffers copies of OSI layer 3 packets being transmitted via lower layers (205, 215) of the interface and manages the buffer contents using indications the IBML receives from one or more of the lower layers. When the IBML receives an indication that a link layer hard handoff is proceeding, the IBML transfers the presently buffered packets to a corresponding IBML (202, 212) in the target communications interface. This sub-layer 3 buffer transfer enables the target communications interface to reduce packet-loss associated with the hard handoff.

18 Claims, 5 Drawing Sheets

OTHER PUBLICATIONS

"Universal Mobile Telecommunications System (UMTS); Radio Link Control (RLC) protocol specification (3GPP TS 25.322 version 6.2.0 Release 6); ETSI TS 125 322" ETSI Standards, European Telecommunications Standards Institute, Sophia-Antipo, FR, vol. 3-R2, No. V620, Dec. 2004, pp. 22-24.

Yogesh Bhatt, Ajoy Singh: "Lossless Inter-technology handover using L2 SDU transmission indications", IEEE 802.21 Session #9, Jul. 11, 2005, pp. 1-4, San Francisco, CA.

* cited by examiner

METHOD AND APPARATUS FOR IMPROVED LINK LAYER HANDOFF

REFERENCE(S) TO RELATED APPLICATION(S)

The present application claims priority from provisional application, Ser. No. 60/659,132, entitled "METHOD AND APPARATUS FOR IMPROVED LINK LAYER HANDOFF," filed Mar. 7, 2005, which is commonly owned and incorporated herein by reference in its entirety.

FIELD OF THE INVENTION

The present invention relates generally to communication systems and, in particular, to improved link layer handoff in wireless communication systems.

BACKGROUND OF THE INVENTION

Packet switched wireless access networks contain AN (Access Network) elements that are connected to AR (Access Router) elements. Typically, an AR serves an MN (Mobile Node) via the AN which is presently serving the MN. Again typically, an AR performs the function of a mobility agent to support the network layer mobility of the MN. In the event of an inter-AR handoff of the MN within the same wireless technology or across different wireless technologies, the mobility agent for the MN switches from the source AR to the target AR. This results in a new link layer connection being established between the MN and the new AR.

The re-establishment of a new link layer connection with the target AN causes the link layers (e.g., the ARQ layer) of both the source AN and the MN to flush their outstanding transmit and re-transmit queues. The flushing of outstanding radio frames can result in a noticeable performance impact for the affected end-to-end applications, especially VoIP-based (voice over internet protocol) and PTT-based (push-to-talk) applications. Such packet loss may also cause a TCP (Transmission Control Protocol) sender to initiate congestion control by invoking the slow start procedure. This may, in turn, impact the end-to-end performance of the TCP-based application.

Therefore, a need exists for an apparatus and method that improves link layer handoff by addressing the packet-loss problem existing today.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to address the need for an apparatus and method that improves link layer handoff by addressing the packet-loss problem existing today. An intermediate buffer management layer (IBML) is introduced below layer 3 of an OSI-based communications interface. The IBML buffers copies of OSI layer 3 packets being transmitted via lower layers of the interface and manages the buffer contents using indications the IBML receives from one or more of the lower layers. When the IBML receives an indication that a link layer hard handoff is proceeding, the IBML transfers the presently buffered packets to a corresponding IBML in the target communications interface. This sub-layer 3 buffer transfer enables the target communications interface to reduce packet-loss associated with the hard handoff.

Figure 1:
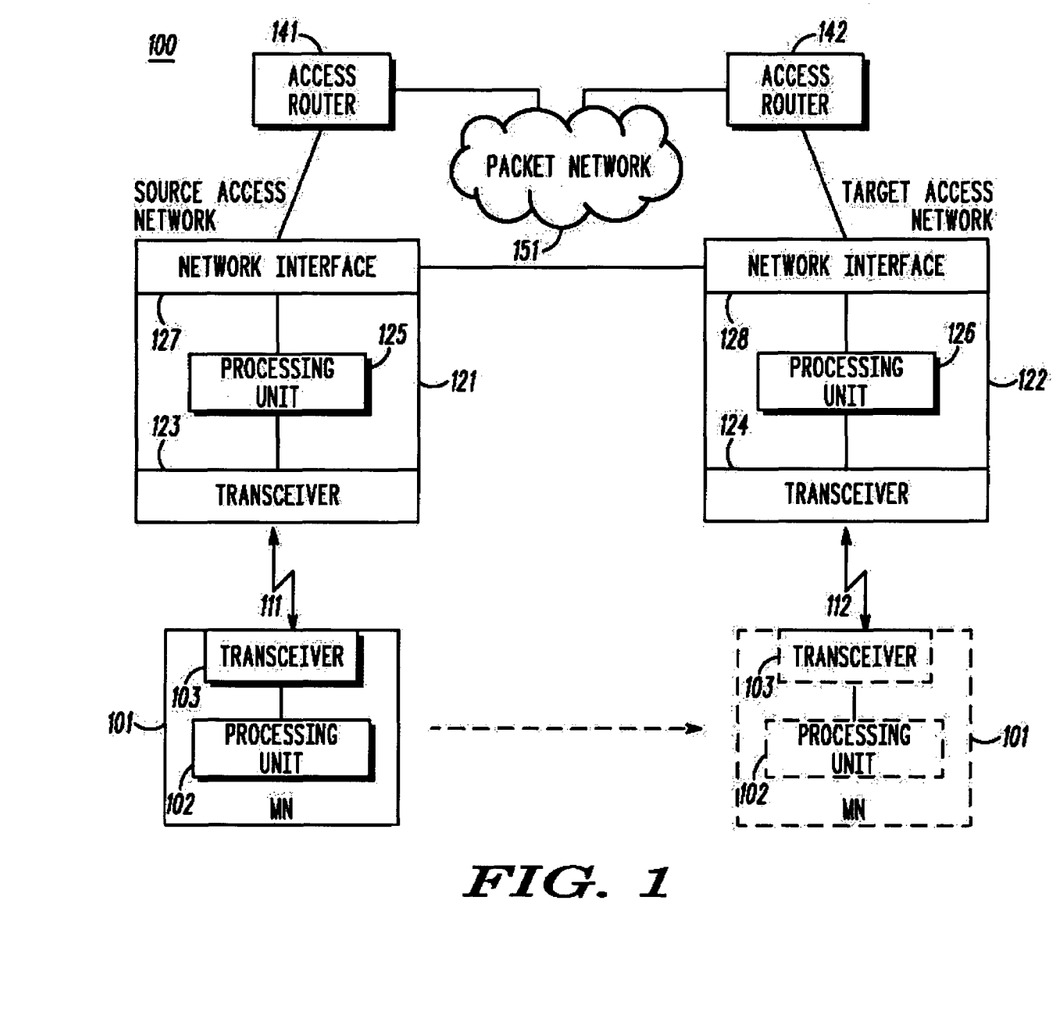
FIG. 1 is a block diagram depiction of a wireless communication system in accordance with multiple embodiments of the present invention.

The disclosed embodiments can be more fully understood with reference to FIGS. 1-5. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. Communication system 100 represents a system having access networks based on different wireless technologies. For example, the description that follows will assume that AN 121 is IEEE 802.XX-based while AN 122 is 3GPP2-based. Thus, AN 121 employs wireless technologies such as IEEE's 802.11, 802.16, or 802.20, while AN 122 employs wireless technologies such as CDMA 2000 or HRPD (also known as 1xEV-DO or IS-856), both ANs 121 and 122 suitably modified to implement the present invention. Alternative embodiments of the present invention may be implemented in communication systems that employ other or additional technologies such as, but not limited to, those described in the 3GPP specifications (e.g., GSM, GPRS, EDGE, W-CDMA, UTRAN, FOMA, UMTS, HSDPA, and HSUPA), those described in the IS-136 (TDMA Third Generation Wireless Standards) specification, those described in the IS-95

(CDMA) specification, 1×EV-DV technologies, and integrated dispatch enhanced network technologies.

More specifically, communication system 100 comprises mobile node (MN) 101, access networks (ANs) 121 and 122, access routers (ARs) 141 and 142, and packet network 151. Those skilled in the art will recognize that FIG. 1 does not depict all of the network equipment necessary for system 100 to operate but only those system components and logical entities particularly relevant to the description of embodiments herein. For example, ANs are known to comprise devices such as WLAN (wireless local area network) stations (which include access points (APs), AP controllers/switches, and/or WLAN switches), base transceiver stations (BTSs), base site controllers (BSCs) (which include selection and distribution units (SDUs)), packet control functions (PCFs), packet control units (PCUs), and/or radio network controllers (RNCs). However, none of these devices are specifically shown in FIG. 1.

Instead, ANs 121 and 122 are depicted in FIG. 1 as comprising processing units 125 and 126, network interfaces 127 and 128, and transceivers 123 and 124. In general, components such as processing units, network interfaces, and transceivers are well-known. For example, AN processing units are known to comprise basic components such as, but not limited to, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using messaging flow diagrams, and/or expressed using logic flow diagrams.

Thus, given an algorithm, a logic flow, a messaging flow, and/or a protocol specification, those skilled in the art are aware of the many design and development techniques available to implement an AN processing unit that performs the given logic. Therefore, ANs 121 and 122 represent known ANs that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, the AN aspect of the present invention may be implemented in any of the AN devices listed above or distributed across such components.

ANs 121 and 122 use wireless interfaces 111 and 112 for communication with MN 101. Since, for the purpose of illustration, AN 121 is IEEE 802.XX-based while AN 122 is 3GPP2-based, wireless interfaces 111 and 112 correspond to an IEEE 802.XX air interface and a 3GPP2 air interface, respectively.

MN platforms are known to refer to a wide variety of consumer electronic platforms such as, but not limited to, mobile stations (MSs), access terminals (ATs), terminal equipment, gaming devices, personal computers, and personal digital assistants (PDAs). In particular, MN 101 comprises processing unit 102, transceiver 103, a keypad (not shown), a speaker (not shown), a microphone (not shown), and a display (not shown). Processing units, transceivers, keypads, speakers, microphones, and displays as used in MNs are all well-known in the art.

For example, MN processing units are known to comprise basic components such as, but not limited to, microprocessors, digital signal processors (DSPs), microcontrollers, memory devices, application-specific integrated circuits (ASICs), and/or logic circuitry. Such MS components are typically adapted to implement algorithms and/or protocols that have been expressed using high-level design languages or descriptions, expressed using computer instructions, expressed using messaging flow diagrams, and/or expressed using logic flow diagrams. Thus, given an algorithm, a logic flow, a messaging/signaling flow, a call flow, and/or a protocol specification, those skilled in the art are aware of the many design and development techniques available to implement user equipment that performs the given logic. Therefore, MN 101 represents a known MN that has been adapted, in accordance with the description herein, to implement embodiments of the present invention.

Operation of various embodiments in accordance with the present invention occur substantially as follows. Relevant operation begins with AN 121, MN 101, or both AN 121 and MN 101 sending messaging to each other via wireless interface 111 using an Open Systems Interconnection (OSI)-based communications interface. In particular, the OSI-based communication interfaces are employed by processing units 125 and 102 to transmit messaging via respective transceivers 123 and 103 to MN 101 and AN 121, respectively. While sending and receiving messaging, a hard handoff from serving, or source, AN 121 to target AN 122 occurs.

Figure 2:
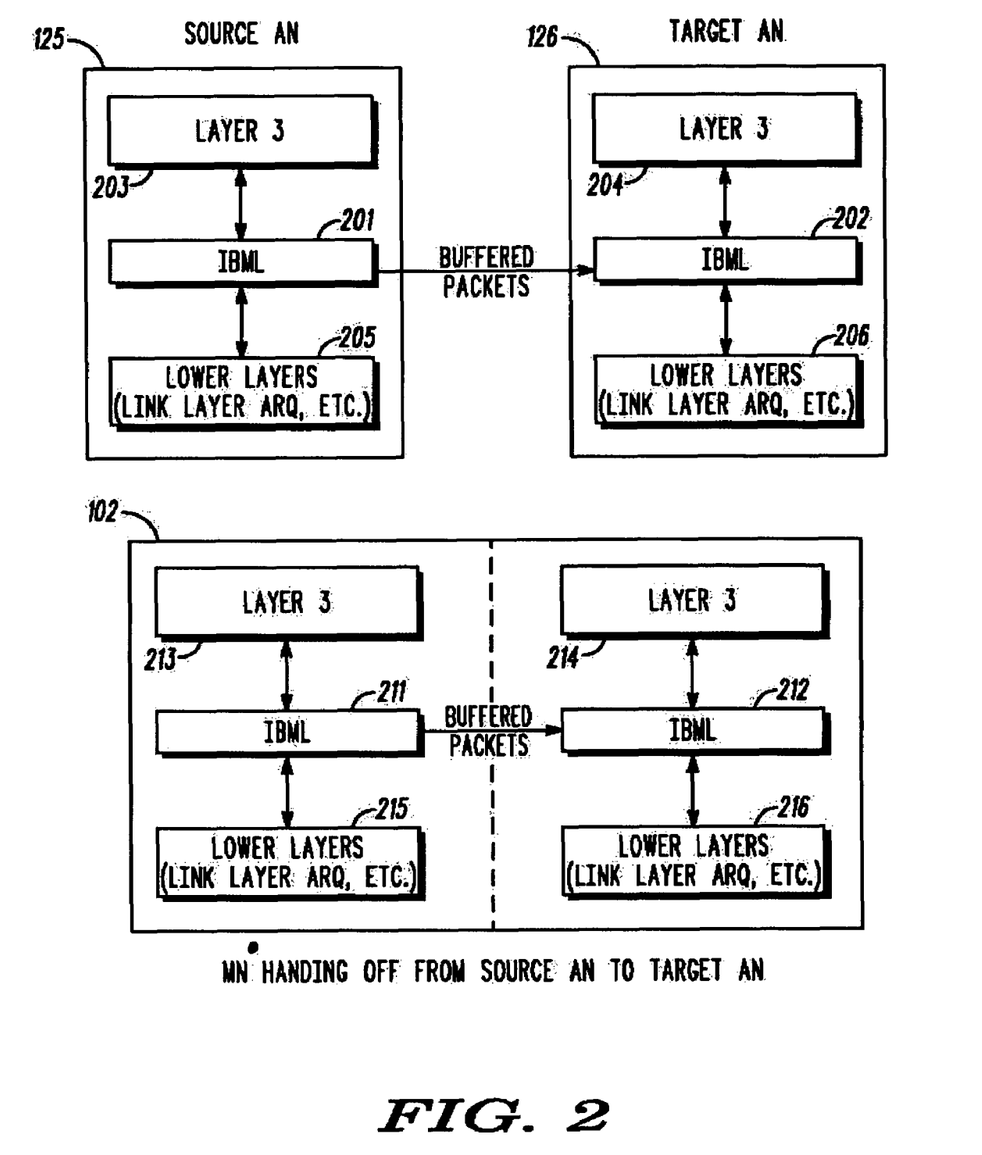
FIG. 2 is a block diagram depiction of Open Systems Interconnection (OSI)-based communication interfaces active in an MN (mobile node), a source AN (access network), and a target AN during a link layer handoff from the source AN to the target AN by the MN, in accordance with multiple embodiments of the present invention.

FIG. 2 is a block diagram depiction of OSI-based communication interfaces active in MN 101, source AN 121, and target AN 122 during a link layer handoff by MN 101 from source AN 121 to target AN 122, in accordance with multiple embodiments of the present invention. OSI-based communication interfaces are depicted as being implemented by source AN processing unit 125, target AN processing unit 126, and MN processing unit 102. MN processing unit 102 is depicted as implementing an OSI-based communication interface for each AN, AN 121 and AN 122 utilizing different wireless signaling technologies. Each communications interface comprises processing layers based on the OSI layering model. In FIG. 2, layer 3 is depicted by blocks 203, 204, 213 and 214 in each communications interface, while lower layers (layers below layer 3) are depicted by blocks 205, 206, 215 and 216. Embodiments of the present invention, also include an additional layer, an intermediate buffer management layer (IBML), depicted by blocks 201, 202, 211 and 212.

Figure 3:
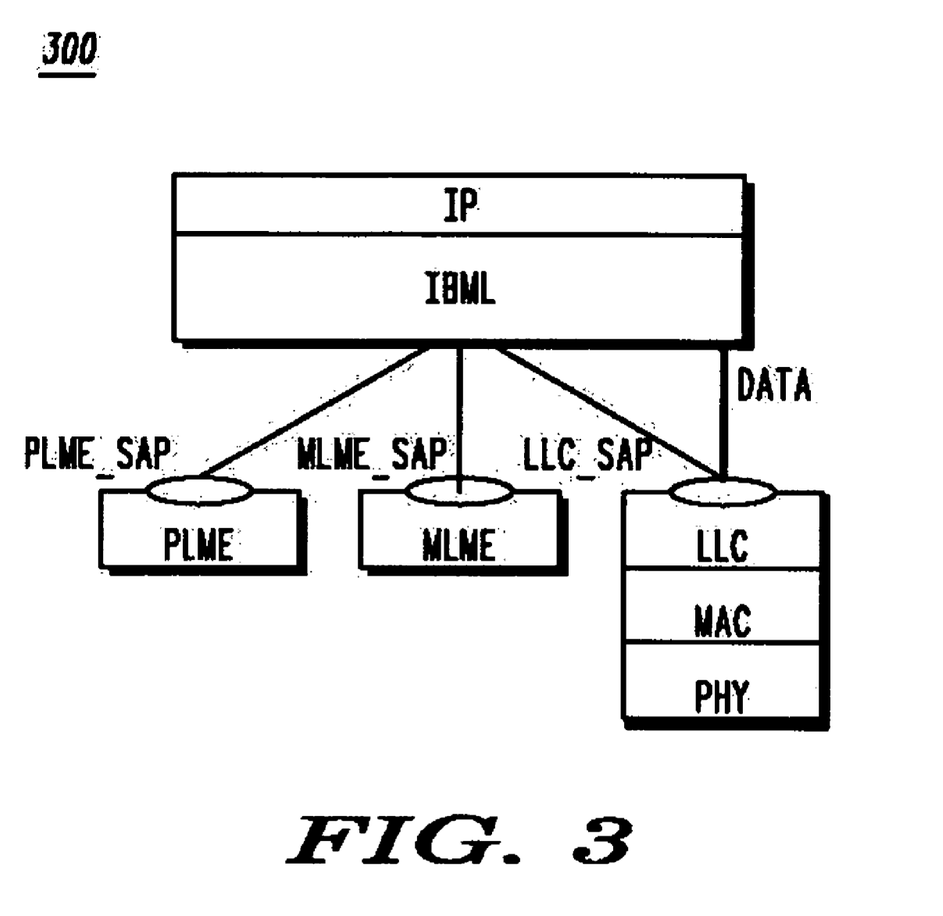
FIG. 3 is a block diagram depiction of a protocol stack for an IEEE (Institute of Electrical and Electronics Engineers) 802.XX-based access network, in accordance with multiple embodiments of the present invention.
Figure 4:
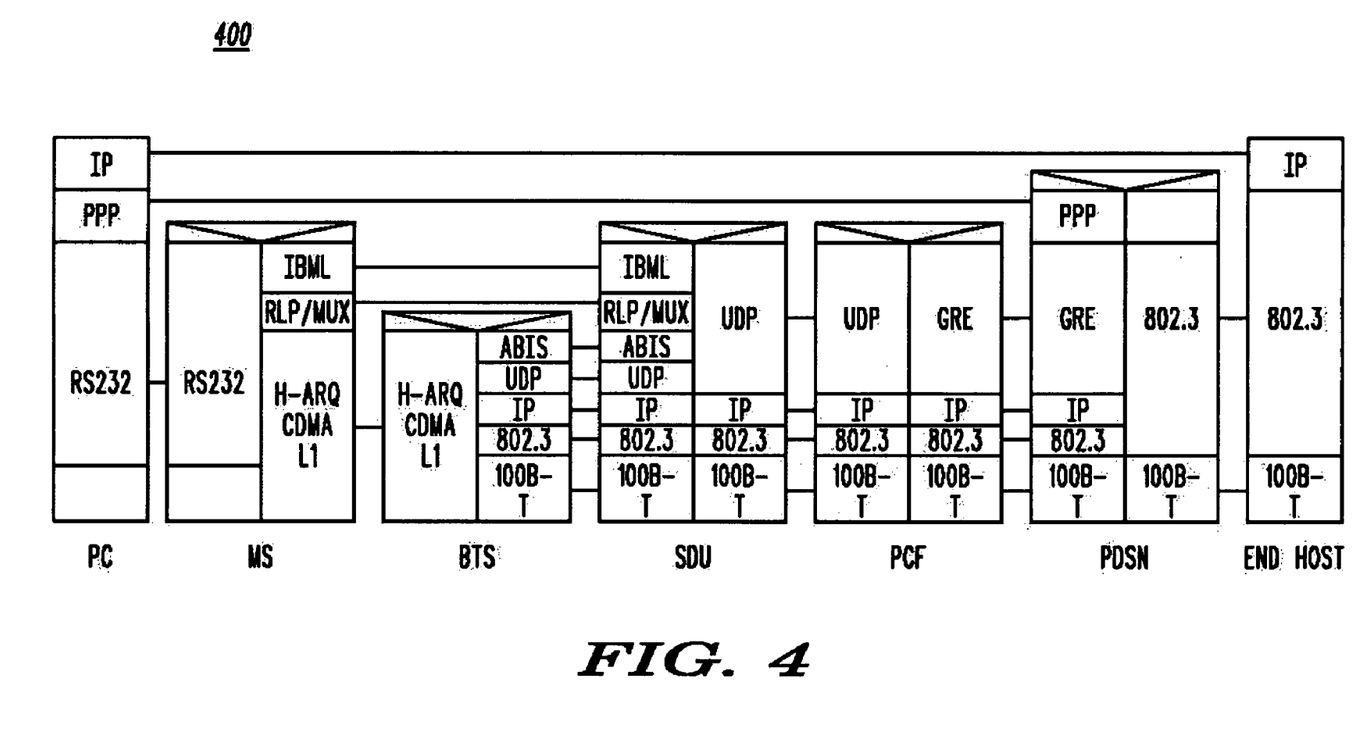
FIG. 4 is a block diagram depiction of a protocol stack for a 3GPP2 (3rd Generation Partnership Project 2)-based access network, in accordance with multiple embodiments of the present invention.

FIGS. 3 and 4 depict examples of portions of OSI-based communication interfaces implemented by some embodiments of MN 101, source AN 121, and target AN 122. FIG. 3 is a block diagram depiction of protocol stack 300 for an IEEE 802.XX-based access network. Thus, as an example, protocol stack 300 depicts protocol stack layers that layers 201, 203 and 205 as well as layers 211, 213 and 215 implement. In the case of protocol stack 300, lower layers 205 and 215 each comprise a Logical Link Control (LLC) layer, a MAC Layer Management Entity (MLME), a Physical Layer Management Entity (PLME), a Medium Access (MAC) layer, and a physical layer.

Similarly, FIG. 4 is a block diagram depiction of protocol stack 400 for a 3GPP2-based access network. Thus, as an example, protocol stack 400 depicts protocol stack layers that layers 202, 204 and 206 (see SDU stack) as well as layers 212, 214 and 216 implement (see MS stack). In the case of protocol stack 400, lower layers 206 and 216 each comprise a Radio Link Protocol (RLP) layer among others.

Both protocol stacks 300 and 400 include an intermediate buffer management layer between layer 3 and the link layer ARQ functionality below layer 3. Source AN processor 125 buffers copies of OSI layer 3 packets in IBML 201. These are OSI layer 3 packets being transmitted via lower layers 205 to MN 101. Likewise, MN processor 102 buffers copies of OSI layer 3 packets in IBML 211. These are OSI layer 3 packets being transmitted via lower layers 215 to AN 121.

Lower layers 205 and 215 then operate to determine whether all portions of the transmitted packets were successfully transmitted. For example, an automatic retransmission request (ARQ) layer of lower layers 205 and 215 may use implicit/explicit ACK/NAK along with a mapping table that maps higher layer packet IDs (e.g., IP id) to the sequence number of segments belonging to the corresponding ARQ frames to determine whether all the segments belonging to a layer 3 packet have been received or not.

When lower layers 205 or 215 determine that a packet has been successfully transmitted, an indication is sent to the respective IBML 201 or 211. Generally, these indications may take the form of triggers, events, or messages of some form. For example, in some embodiments, these indications that a buffered packet has been successfully transmitted comprise LLC primitives. As depicted by FIG. 3, LLC_SAP (LLC service access point), used by IBMLs 201 and 211 to send and receive data, can also be used to convey an LLC primitive (e.g., TX-SUCCESS-IND) indicating a successful packet transmission. When IBML 201 or 211 receives a successful transmit indication, the successfully transmitted packet is removed from the IBML buffer.

In the above example, lower layers 205 and 215 use link layer specific means to detect whether packets have been transmitted successfully over the wireless link or not. If lower layers 205 and 215 are unable to detect that packets have been successfully received by their respective peer entities, IBMLs 201 and 211 can use a timer based approach to decide when to flush the content of their respective buffers. In particular, IBMLs 201 and 211 may use a blackout timer to decide how long to buffer layer 3 packets in the absence of an indication of successful (or failed) transmission. When IBMLs 201 and 211 detect a timer expiration of a timer associated with a buffered packet, IBMLs 201 and 211 remove the buffered packet from their respective buffers. The timeout value of these blackout timers can be set equal to the particular link layer handoff blackout time.

Lower layers 205 and 215 also operate to determine whether a transmitted packet was not successfully transmitted. For example, an ARQ layer of lower layers 205 and 215 detects when one or more segments of a buffered packet has been aborted. This may be the result of a MAC (Medium Access) layer abort or, in the case of a 3GPP2-based communications interface, an H-ARQ (hybrid automatic retransmission request) abort, an RLC (Radio Link Control) abort, or an RLP (Radio Link Protocol) abort.

When lower layers 205 or 215 determine that a packet has failed a transmission attempt, an indication is sent to the respective IBML 201 or 211. Again, these indications may generally take the form of triggers, events, or messages of some form. For example, in some embodiments, these indications that buffered packets have failed in transmission comprise MAC Layer Management Entity (MLME) primitives. As depicted by FIG. 3, MLME_SAP (MLME service access point) can be used to convey an MLME primitive (e.g., TX-FAIL-IND) indicating a failed packet transmission. When IBMLs 201 and 211 receive such indications, IBMLs 201 and 211 attempt to retransmit the failed packet via respective lower layers 205 and 215.

Lower layers 205 and 215 also operate to determine that a link layer hard handoff from source AN 121 to target AN 122 is proceeding (i.e., imminent or in-process). When lower layers 205 or 215 determine that such a handoff is proceeding, an indication is sent to the respective IBML 201 or 211. Again, these indications may generally take the form of triggers, events, or messages of some form that originate from the operating handoff controller. For example, in some embodiments, these indications that a handoff is proceeding comprise MLME or PLME (Physical Layer Management Entity) primitives. As depicted by FIG. 3, MLME_SAP or PLME_SAP (PLME service access point) can be used to convey the appropriate MLME/PLME primitive (e.g., L2-HO-INIT-IND) indicating a link layer hard handoff is proceeding.

When IBML 201 receives a handoff proceeding indication, IBML 201 transfers the packets presently buffered at IBML 201 to target IBML 202 in target AN 122. The transfer may be enabled by including in the handoff indication address information associated with target IBML 202, such as the network address of IBML 202 itself or an address of the WLAN station/AP/BSC/SDU where IBML 202 can be found. With this information a tunnel may be established to support the transfer between the ANs.

Somewhat differently, when IBML 211 receives a handoff proceeding indication, IBML 211 transfers the packets presently buffered at IBML 211 to target IBML 212 in the target OSI-based communications interface of MN 101. In this case, the transfer from IBML 211 to IBML 212 occurs internally within MN 101 from the source communications interface to the target communications interface. This transfer may be enabled by including in the handoff indication an identifier of the target OSI-based communications interface.

Target IBMLs 202 and 212 receive the packets previously buffered at the respective source IBML 201 and 211. Upon the handoff completing, IBMLs 202 and 212 can retransmit these buffered packets via respective lower layers 206 and 216. Thus, the buffering and subsequent transfer of these buffered packets, when a link layer hard handoff is detected, can reduce the number packets lost during such handoffs on both the uplink and downlink.

As described above, lower layers 205 and 215 operate to determine whether a transmitted packet was not successfully transmitted. When lower layers 205 or 215 determine that a packet has failed a transmission attempt, an indication is sent to the respective IBML 201 or 211, which then attempts to retransmit the failed packet via respective lower layers 205 or 215. In some embodiments, the respective IBML 201 or 211 may also notify a transport layer, such as TCP, that the radio link is poor. For example, if the frequency of SDU-TX-FAIL-IND reaches a threshold, the respective IBML 201 or 211 may notify a local TCP to stop sending additional packets to its peer. The local TCP then sends a TCP ACK to its peer, setting its window field to zero and thereby requesting its peer to stop sending data. The invocation of temporary end-to-end flow control (TCP persistence mode) works to prevent additional packets being dropped over the radio link during handoff. This also prevents TCP congestion control and slow start from being triggered due to the loss of packets during handoff.

When the handoff is complete, the respective target IBML 202 or 212 receives an indication that the handoff has completed and can then notify TCP that data transfer may resume. TCP, in turn, can resume data transfer by sending a TCP ACK with a non-zero window size to its peer. In this example, triggering TCP persistence mode enhances the performance of TCP based applications by avoiding the TCP congestion control/slow start procedure after handoff.

Figure 5:
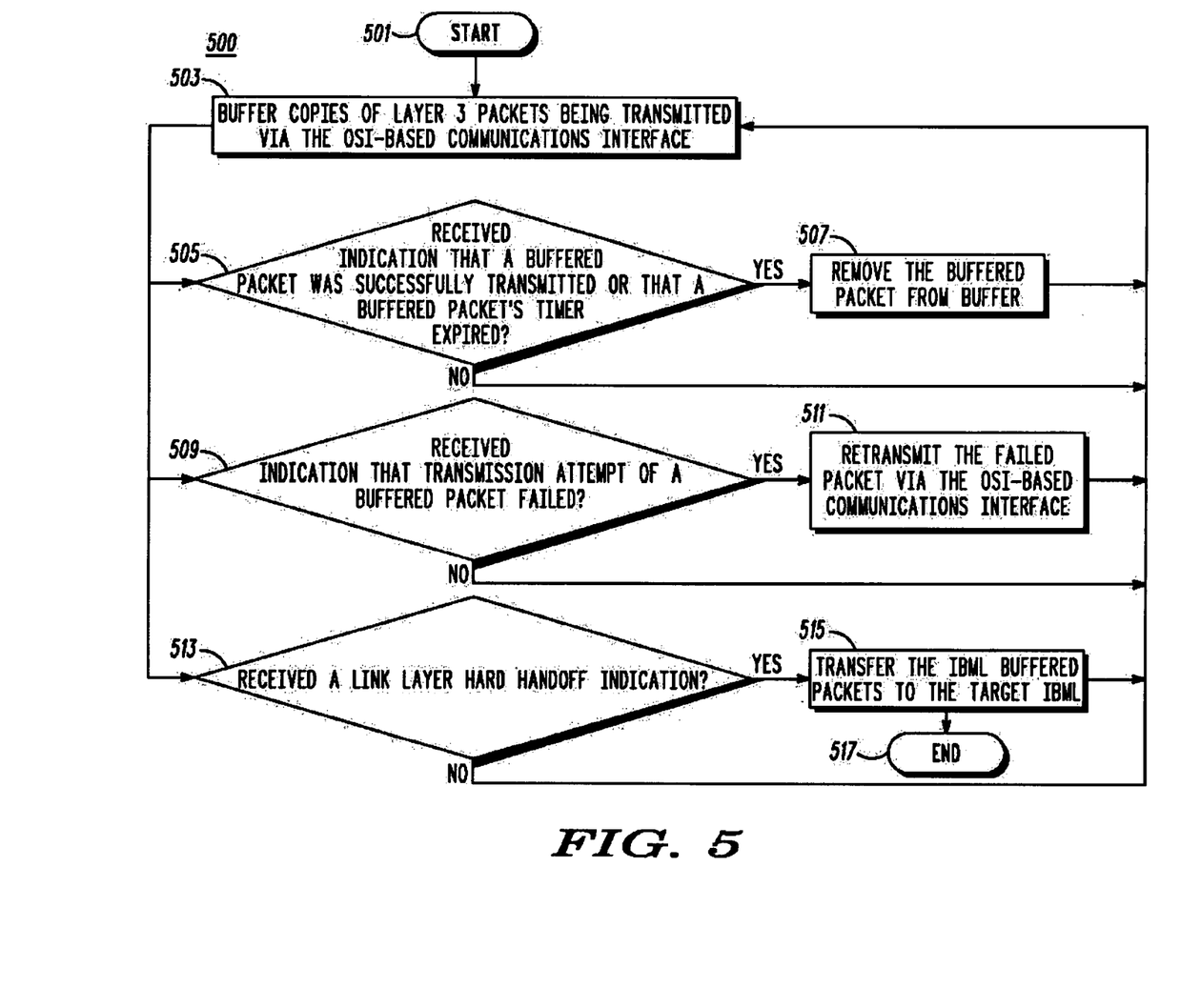
FIG. 5 is a logic flow diagram of functionality performed by an IBML (intermediate buffer management layer) in accordance with multiple embodiments of the present invention.

FIG. 5 is a logic flow diagram of functionality performed by an IBML in accordance with multiple embodiments of the present invention. Logic flow 500 begins (501) with the IBML buffering (503) copies of layer 3 packets that are being transmitted via one or more lower layers (i.e., below layer 3) of the OSI-based communications interface. As the IBML continues to buffer copies of new layer 3 packets, it acts on various received indications. When (505) the IBML receives an indication that one of the buffered packets was successfully transmitted or that a buffered packet's timer expired, the IBML removes (507) the packet from its buffer. When (509) the IBML receives an indication that the transmission attempt of one of the buffered packets failed, the IBML retransmits (511) the failed packet via one or more of the lower layers. Finally, when (513) the IBML receives an indication that a link layer hard handoff is proceeding, the IBML transfers (515) its presently buffered packets to a target IBML in a target OSI-based communications interface and logic flow 500 ends (517).

Various embodiments of the present invention may also be expressed in terms of changes to existing communications standards, such as IEEE 802.XX and 3GPP2. Although there are many ways that these and other standards may be modified to embody the present invention, a couple of specific examples are provided below.

The IEEE 802.XX protocol stack may be modified to include the IBML and various indications. The modifications could include: integrating the IBML between L3 and the LLC layer; adding an SDU-TX-SUCCESS-IND LLC primitive to indicate to the IBML the successful transmission of an IP packet over the radio link; adding an L2-HO-INIT-IND MLME or PLME primitive to indicate to the IBML that the link layer handoff is imminent (as part of this trigger, MLME or PLME will also provide an address of the target AP where the mobile is being handed over to); having LLC send SDU-TX-SUCCES-IND trigger through LLC_SAP; having PLME or MLME send L2-HO-INIT-IND trigger through PLME or MLME SAP, respectively; having IBML use LLC_SAP to send/receive data as well as receive link layer triggers.

With these changes, the IBML would buffer a higher layer packet before sending it to the underlying LLC layer until LLC notifies the IBML, using an SDU-TX-SUCCESS-IND primitive, that the packet has been transmitted successfully over the radio link to the peer LLC entity. MLME or PLME layer sends trigger information to the IBML once it detects that link layer handoff is imminent or completed. The infrastructure IBML using extended IAPP, or some other tunneling mechanism, transmits the buffered IBML packets from the source AP to the target AP. The mobile uses this trigger to transfer the buffered packets from the source interface to the target interface.

The 3GPP2 protocol stack may be modified to include the IBML and various indications. The modifications could include some or all of the following: integrating the IBML between GRE and RLP sublayers of SDU in infrastructure; integrating the IBML between PPP and RLP layers in the mobile node; modifying RLP implementation such that it indicates to the IBML (using SDU-TX-SUCCESS-IND primitive) when it detects that all the segments of a PPP frame have been successfully transmitted to its peer entity (the RLP transmitter may use the L_V(N) peer sequence number update along with information such as mapping of IP Id to the sequence numbers of RLP frames generated for the given IP packet to decide if IP packet have been successfully received by its peer entity or not (the L_V(N)_peer information is received during RLP fill frame exchange)); modifying H-ARQ to indicate to the IBML (using SDU-TX-SUCCESS-IND) primitive once ACK associated with all the segments of an IP packet is received by the H-ARQ layer of MAC-sublayer (the H-ARQ implementation should maintain additional information such as a table containing the mapping of IP identifier with H-ARQ PDU).

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for improved link layer handoff comprising the steps of:
    buffering copies of packets by an intermediate buffer management layer (IBML) in a source Open Systems Interconnection (OSI)-based communications interface to produce a group of buffered packets, wherein the packets are OSI layer 3 packets being transmitted via at least one lower layer of the source OSI-based communications interface, lower layers being below OSI layer 3;
    receiving, by the IBML from a lower layer of the at least one lower layer, an indication that a link layer hard handoff is imminent;
    transferring, by the IBML in response to the link layer hard handoff indication, the group of buffered packets to a target IBML in a target OSI-based communications interface.

2. The method of claim 1, wherein the at least one lower layer of the source OSI-based communications interface comprises at least one protocol layer from the group consisting of a Medium Access (MAC) layer, a Logical Link Control (LLC) layer, a MAC Layer Management Entity (MLME), a Physical Layer Management Entity (PLME), a Radio Link Protocol (RLP) layer, a Radio Link Control (RLC) layer, an automatic retransmission request (ARQ) layer, and a hybrid automatic retransmission request (H-ARQ) layer.

3. The method of claim 1, further comprising:
    receiving, by the IBML from a lower layer of the at least one lower layer, an indication that a packet in the group of buffered packets has been successfully transmitted;
    removing, by the IBML in response to the successful transmission indication, the successfully transmitted packet from the group of buffered packets prior to transferring the group of buffered packets.

4. The method of claim 3, further comprising:
determining, by a lower layer of the at least one lower layer, that all portions of the successfully transmitted packet were successfully transmitted.

5. The method of claim 3, wherein the indication that a packet in the group of buffered packets has been successfully transmitted comprises a Logical Link Control (LLC) primitive.

6. The method of claim 1, further comprising:
detecting, by the IBML, a timer expiration for a packet in the group of buffered packets;
removing, by the IBML in response to the timer expiration, the packet from the group of buffered packets prior to transferring the group of buffered packets.

7. The method of claim 1, further comprising:
receiving, by the IBML from a lower layer of the at least one lower layer, an indication that a packet in the group of buffered packets has failed a transmission attempt;
retransmitting, by the IBML in response to the failed transmission indication, the failed packet via at least one lower layer of the source OSI-based communications interface.

8. The method of claim 7, wherein the indication that a packet in the group of buffered packets has failed a transmission attempt comprises a MAC Layer Management Entity (MLME) primitive.

9. The method of claim 1, wherein the indication that a link layer hard handoff is imminent comprises an identifier of the target OSI-based communications interface.

10. The method of claim 1, wherein the indication that a link layer hard handoff is imminent comprises addressing information associated with the target IBML.

11. The method of claim 1, wherein transferring the group of buffered packets to a target IBML comprises transferring the group of buffered packets via a tunnel.

12. The method of claim 1, wherein the indication that a link layer hard handoff is imminent comprises a primitive from the group consisting of a MAC Layer Management Entity (MLME) primitive and a Physical Layer Management Entity (PLME) primitive.

13. The method of claim 1, further comprising:
receiving, by the IBML from a lower layer of the at least one lower layer, an indication that a packet in the group of buffered packets has failed a transmission attempt;
notifying a transport layer, by the IBML in response to the failed transmission indication, that a radio link is poor.

14. The method of claim 13, further comprising: receiving, by the target IBML, an indication that the link layer hard handoff has completed;
notifying a transport layer, by the target IBML in response to the hard handoff complete indication, that data transfer may resume.

15. An access network (AN) comprising:
a transceiver;
a network interface;
a processing unit, communicatively coupled to the transceiver and the network interface,
adapted to send and receive messaging via the transceiver using a source Open Systems Interconnection (OSI)-based communications interface that includes an intermediate buffer management layer (IBM L),
adapted to buffer copies of packets in the IBML to produce buffered packets, wherein the packets are OSI layer 3 packets being transmitted via at least one lower layer of the source OSI-based communications interface, lower layers being below OSI layer 3,
adapted to determine that a link layer hard handoff to a target AN is imminent,
adapted to transfer via the network interface, in response to the handoff determination, the buffered packets to a target IBML in a target OSI-based communications interface of the target AN.

16. The AN of claim 15, wherein the at least one lower layer of the source OSI-based communications interface comprises at least one protocol layer from the group consisting of a Medium Access (MAC) layer, a Logical Link Control (LLC) layer, a MAC Layer Management Entity (MLME), a Physical Layer Management Entity (PLME), a Radio Link Protocol (RLP) layer, a Radio Link Control (RLC) layer, an automatic retransmission request (ARQ) layer, and a hybrid automatic retransmission request (H-ARQ) layer.

17. The AN of claim 15, wherein the processing unit is further adapted to determine that a packet in the group of buffered packets has been successfully transmitted via the transceiver, and adapted to remove, in response to the successful transmission determination, the successfully transmitted packet from the group of buffered packets prior to transferring the group of buffered packets.

18. The AN of claim 15, wherein the processing unit is further adapted to determine that a packet in the group of buffered packets has failed a transmission attempt; and adapted to retransmit in response to the failed transmission determination, the failed packet via at least one lower layer of the source OSI-based communications interface.

* * * * *